United States Patent
Qian et al.

(10) Patent No.: US 10,966,256 B2
(45) Date of Patent: Mar. 30, 2021

(54) METHOD AND APPARATUS FOR SELECTING RANDOM ACCESS CHANNEL IN WIRELESS COMMUNICATION SYSTEMS

(71) Applicant: Samsung Electronics Co., Ltd, Suwon-si (KR)

(72) Inventors: Chen Qian, Beijing (CN); Bin Yu, Beijing (CN); Di Su, Beijing (CN); Qi Xiong, Beijing (CN); Yingjie Zhang, Beijing (CN); Jingxing Fu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/476,035

(22) PCT Filed: Jan. 9, 2018

(86) PCT No.: PCT/KR2018/000424
§ 371 (c)(1),
(2) Date: Jul. 3, 2019

(87) PCT Pub. No.: WO2018/128524
PCT Pub. Date: Jul. 12, 2018

(65) Prior Publication Data
US 2019/0350006 A1 Nov. 14, 2019

(30) Foreign Application Priority Data
Jan. 9, 2017 (CN) .......................... 201710014198.2

(51) Int. Cl.
*H04W 74/08* (2009.01)
*H04W 72/04* (2009.01)
(Continued)

(52) U.S. Cl.
CPC ... *H04W 74/0833* (2013.01); *H04W 72/0446* (2013.01); *H04W 72/0453* (2013.01);
(Continued)

(58) Field of Classification Search
CPC ........... H04W 4/06; H04W 4/70; H04W 4/80; H04W 72/0453; H04W 74/08;
(Continued)

(56) References Cited

U.S. PATENT DOCUMENTS 9,313,608 B2    4/2016  Ahn et al.
2010/0178933 A1*  7/2010  Du ........................ H04W 74/08
                                                           455/456.1
(Continued)

FOREIGN PATENT DOCUMENTS

KR    10-2014-0003633 A    1/2014

OTHER PUBLICATIONS

ZTE Corporation et al., "Random access preamble structure and signaling", 3GPP TSG RAN WG1 Meeting #87, Nov. 14-18, 2016, 6 pages, R1-1611271.
(Continued)

*Primary Examiner* — Harun Chowdhury

(57) ABSTRACT

The present disclosure relates to a pre-5$^{th}$-Generation (5G) or 5G communication system to be provided for supporting higher data rates beyond 4$^{th}$-Generation (4G) communication system such as long term evolution (LTE). A method for operating a terminal in a wireless communication system is provided. The method includes acquiring information regarding resource set comprising a plurality of random access channels, selecting a random access channel among the plurality of the random access channels, and transmitting, to a base station, a preamble on the random access channel.

6 Claims, 7 Drawing Sheets

(51) Int. Cl.
  *H04W 76/11* (2018.01)
  *H04W 72/06* (2009.01)
  *H04W 74/02* (2009.01)

(52) U.S. Cl.
  CPC ............ *H04W 72/06* (2013.01); *H04W 74/02* (2013.01); *H04W 76/11* (2018.02)

(58) Field of Classification Search
  CPC ......... H04W 74/0833; H04W 74/0841; H04W 72/0446; H04W 72/06; H04W 76/11
  USPC ............... 370/252, 329, 335, 342; 455/456.1
  See application file for complete search history.

(56) References Cited

U.S. PATENT DOCUMENTS

| | | | | |
|---|---|---|---|---|
| 2015/0124746 | A1* | 5/2015 | Wu ................... | H04W 74/0833 370/329 |
| 2017/0202028 | A1* | 7/2017 | Gaal ....................... | H04W 4/70 |
| 2017/0223743 | A1* | 8/2017 | Lin .................... | H04W 72/0453 |
| 2019/0254082 | A1* | 8/2019 | Takeda .................. | H04W 74/08 |

OTHER PUBLICATIONS

Qualcomm Incorporated, "Reciprocity vs Non-reciprocity in Initial Access/RACH", 3GPP TSG RAN WG1 Meeting #87, Nov. 14-18, 2016, 10 pages, R1-1612037.

AT&T, "NR Random Access Procedure Design", 3GPP TSG RAN1 Meeting #87, Nov. 14-18, 2016, 5 pages, R1-1612362.

NTT Docomo, Inc., "Views on random access procedure for NR", 3GPP TSG RAN WG1 Meeting #87, Nov. 14-18, 2016, 5 pages, R1-1612709.

International Telecommunication Union, IMT Traffic estimates beyond year 2020, Oct. 21, 2014, 35 pages.

International Telecommunication Union, "Future technology trends of terrestrial IMT systems", Nov. 2014, 32 pages.

International Telecommunication Union, "IMT Vision-Framework and overall objectives of the future development of IMT for 2020 and beyond", Sep. 2015, 21 pages.

International Search Report dated Apr. 25, 2018 in connection with International Patent Application No. PCT/KR2018/000424, 3 pages.

Written Opinion of the International Searching Authority dated Apr. 25, 2018 in connection with International Patent Application No. PCT/KR2018/000424, 6 pages.

* cited by examiner

[Fig. 1]
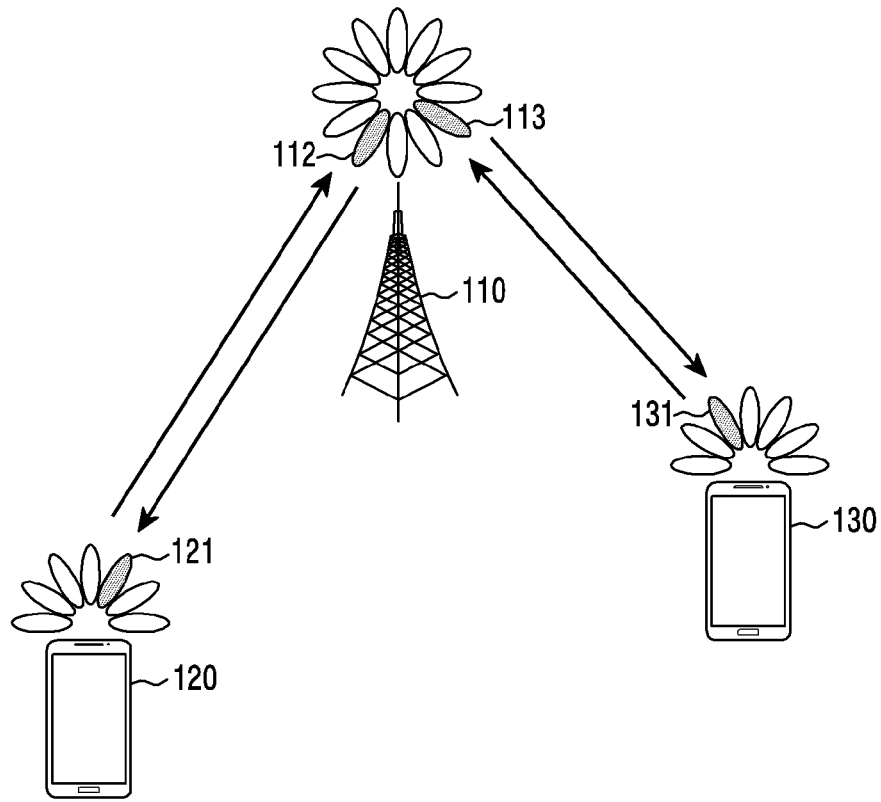
[Fig. 2]
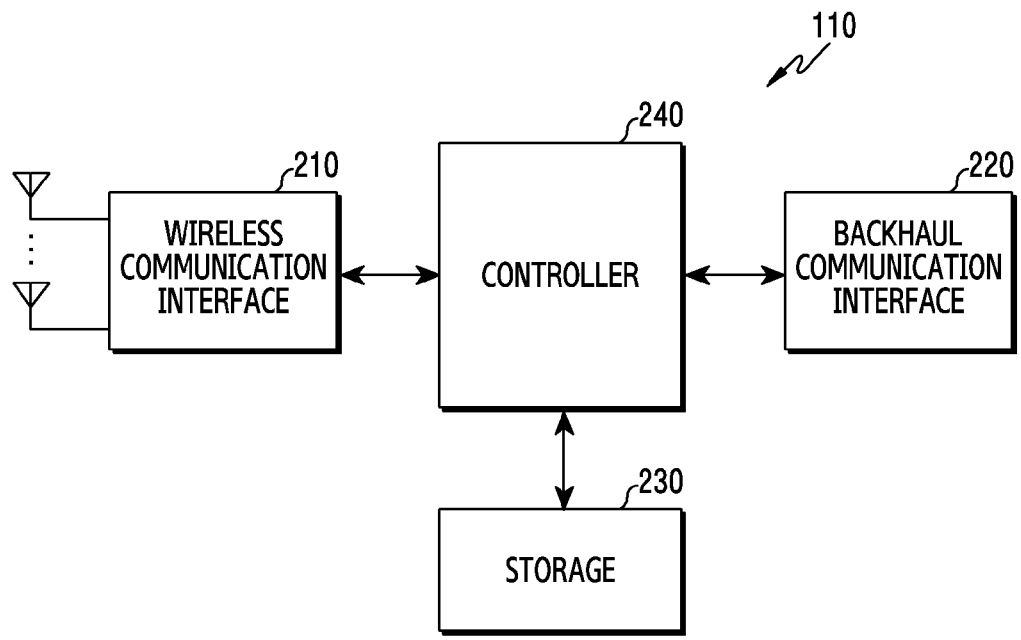

[Fig. 3]
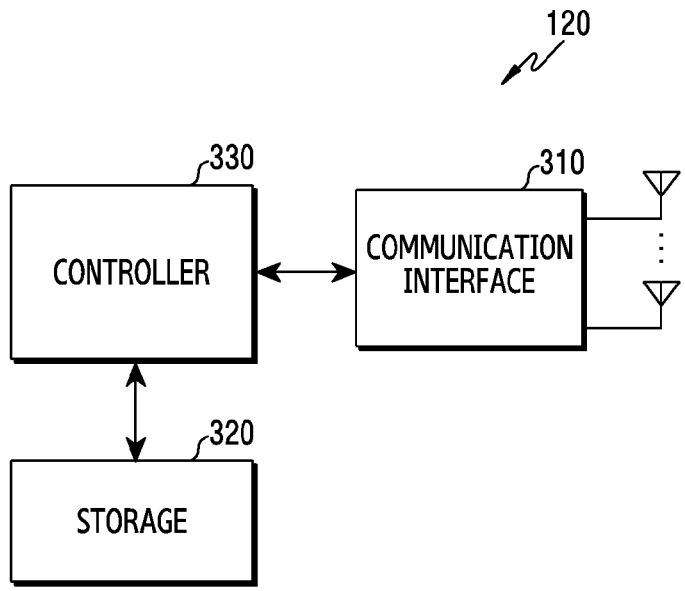
[Fig. 4]
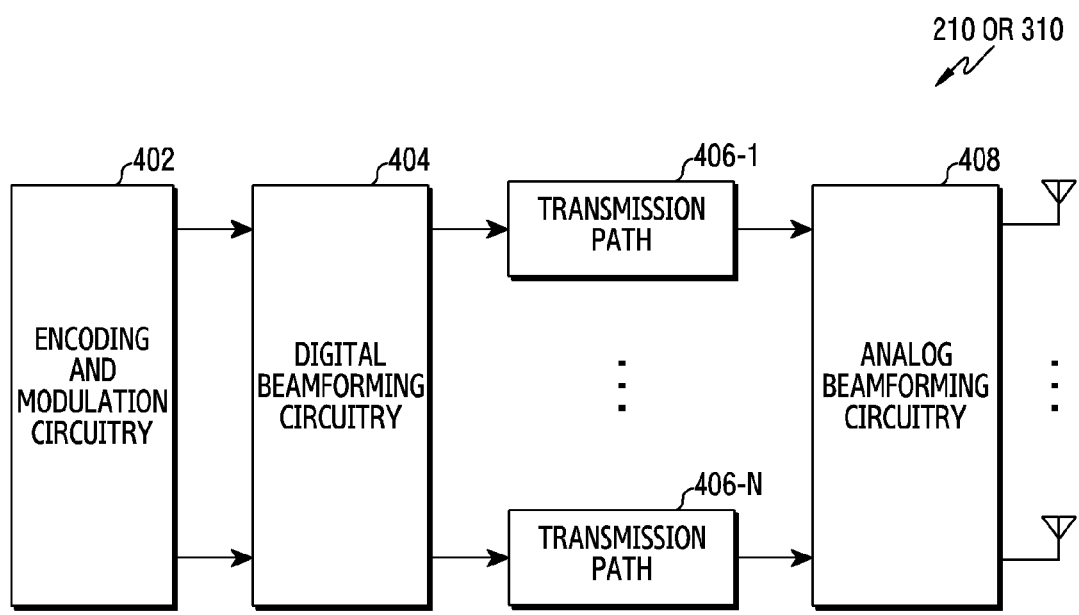

[Fig. 5]
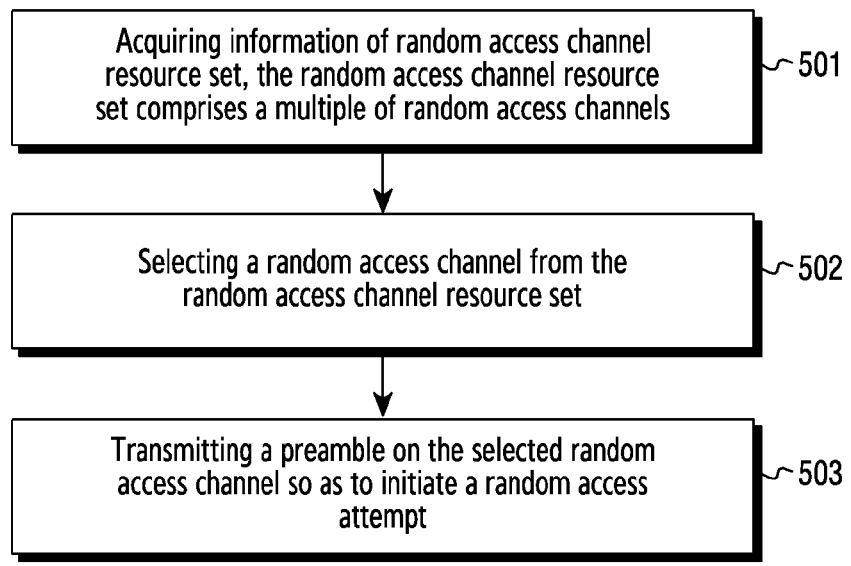

[Fig. 6]
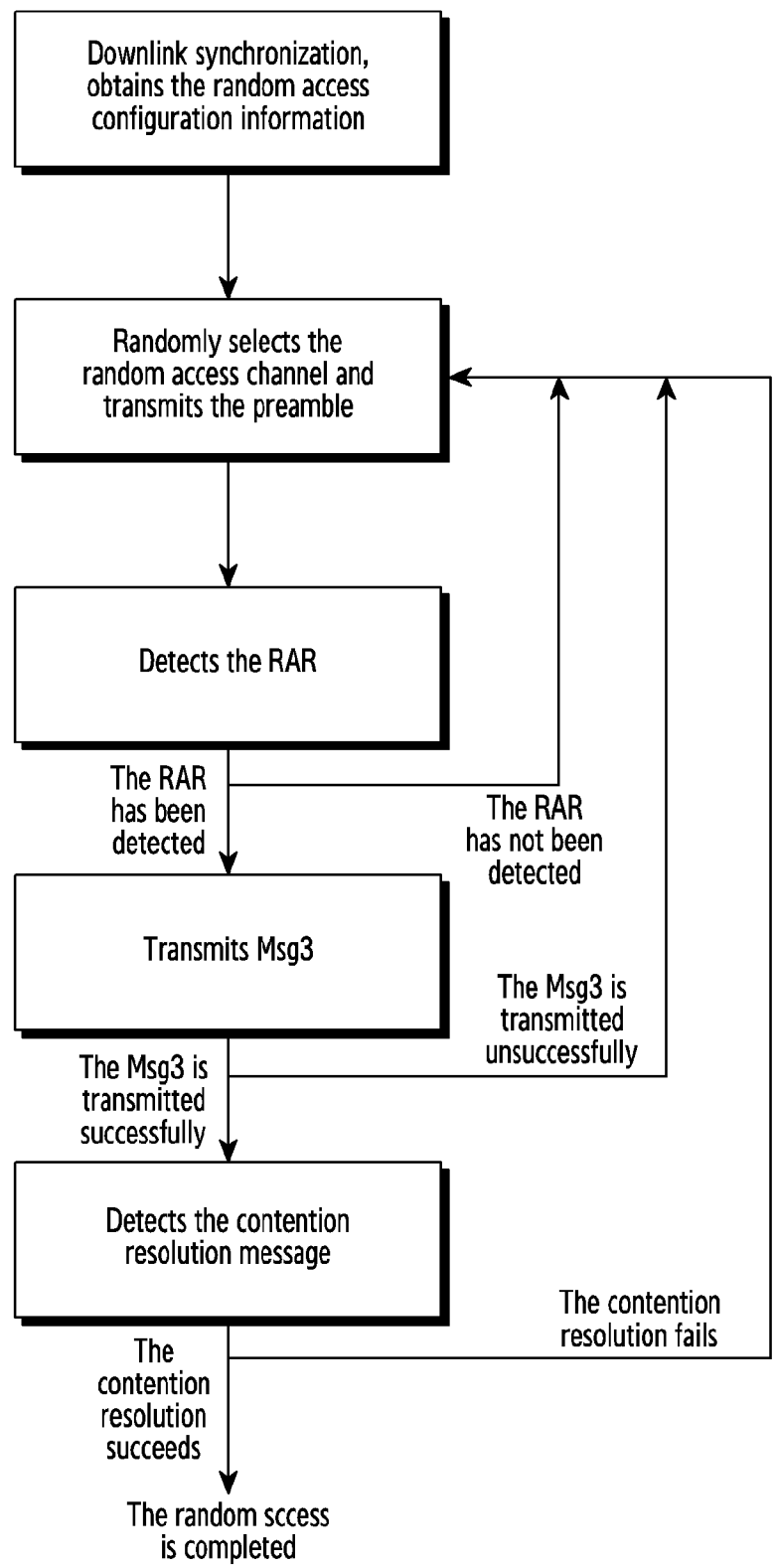

[Fig. 7]
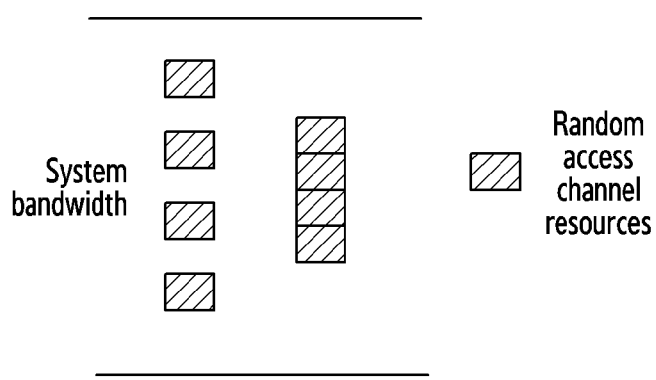
[Fig. 8]
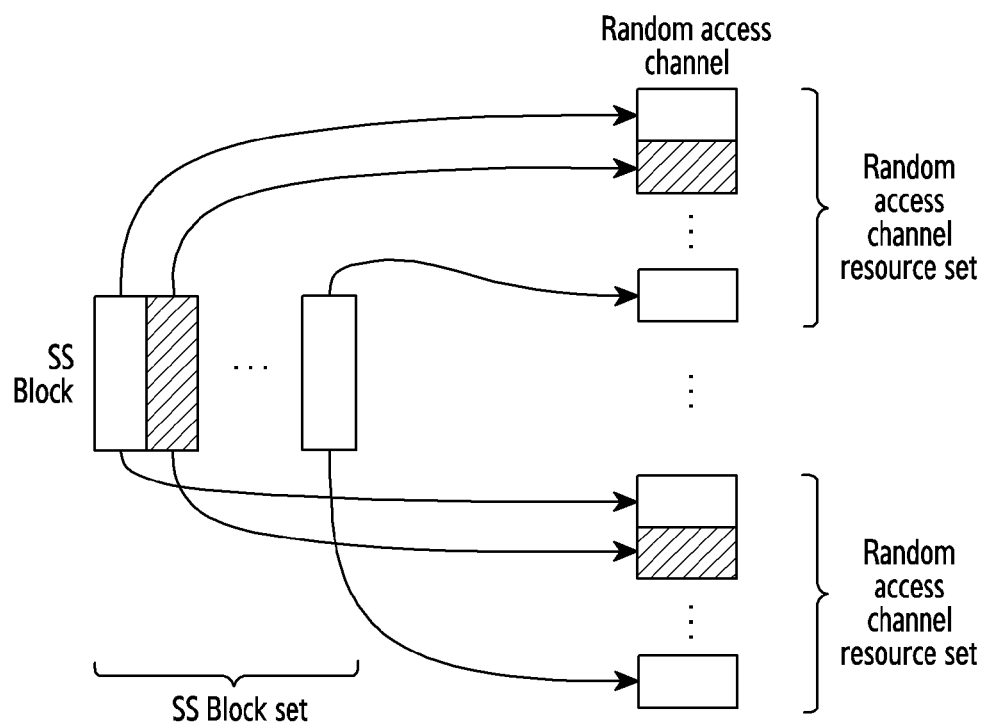

[Fig. 9]
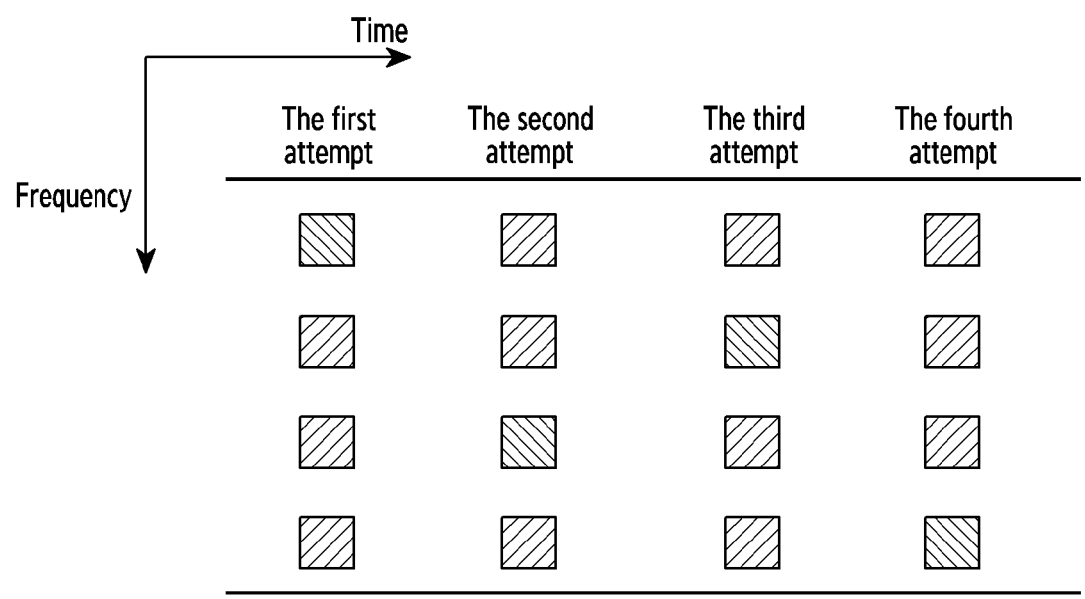
[Fig. 10]
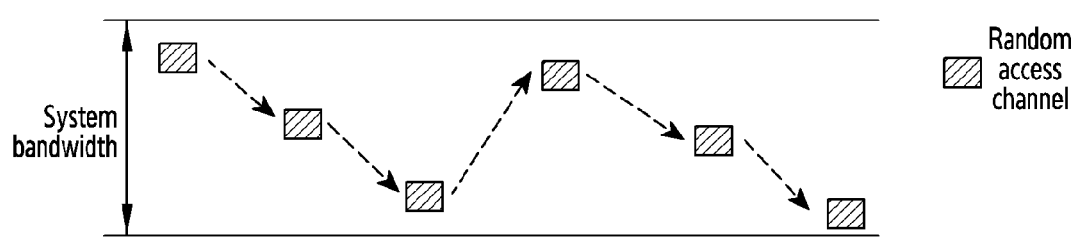

[Fig. 11]
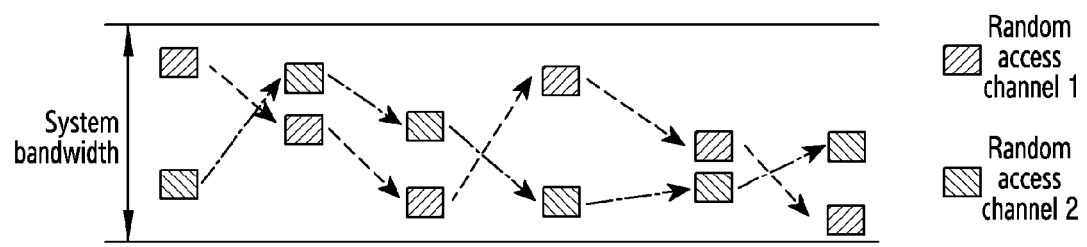
[Fig. 12]
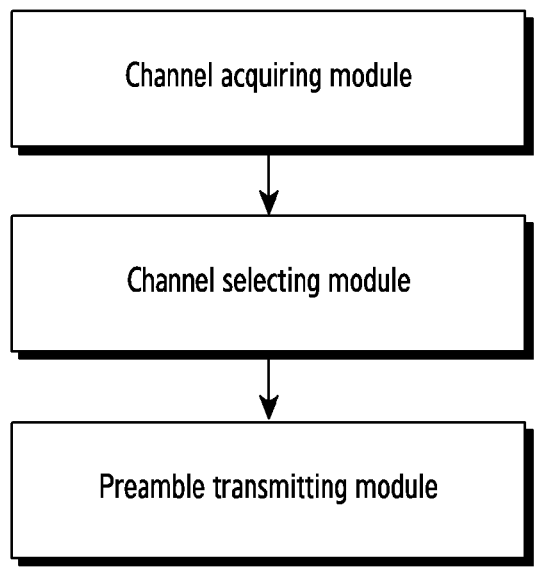

METHOD AND APPARATUS FOR SELECTING RANDOM ACCESS CHANNEL IN WIRELESS COMMUNICATION SYSTEMS

CROSS-REFERENCE TO RELATED APPLICATIONS

This application is a 371 of International Application No. PCT/KR2018/000424 filed on Jan. 9, 2018, which claims priority to Chinese Patent Application No. 201710014198.2 filed on Jan. 9, 2017, the disclosures of which are herein incorporated by reference in their entirety.

BACKGROUND

1. Field

This disclosure relates generally to wireless communication systems. More specifically, this disclosure relates to a method and an apparatus for selecting random access channel in wireless communication systems.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

Embodiments of the present disclosure provide a method and an apparatus for selecting random access channel in wireless communication systems.

Embodiments of the present disclosure provide a method and a user equipment which has a large random access frequency hopping range, a high frequency diversity gain and an ideal random access performance.

In one embodiment, a method for selecting random access channel in wireless communication system provided.

The method includes acquiring information of random access channel resource set, the random access channel resource set comprising a multiple of random access channels; selecting a random access channel from the random access channel resource set; transmitting a preamble on the selected random access channel so as to initiate a random access attempt.

Preferably, wherein, the random access channel resource set only comprises one random access channel.

Preferably, wherein, the step of selecting a random access channel from the random access channel resource set, comprises: selecting a random access channel from the random access channel resource set in a random or a pseudo-random manner.

Preferably, wherein, the random access channel resource set comprises at least two random access channels with different frequency-domain positions; and the step of selecting a random access channel from the random access channel resource set in a random or a pseudo-random manner comprises: selecting a random access channel from the random access channels with different frequency-domain positions generated by using a pseudo-random function.

Preferably, wherein, the step of selecting a random access channel from the random access channels with different frequency-domain positions generated by using a pseudo-random function comprises: ranking and numbering the random access channels with different frequency-domain positions in an ascending order of frequency so as to obtain indexes 0~K−1, selecting an index by rule of $n_{RA}=g(K)$, so as to select the random access channel corresponding to the index, wherein, $n_{RA}$ represents random access channel index used to transmit the preamble for this time, g( ) represents a pseudo-random generation function, and the function g( ) is used to generate pseudo-random numbers ranging from 0~K−1.

Preferably, wherein, the step of selecting a random access channel from the random access channels with different frequency-domain positions generated by using a pseudo-random function comprises:

ranking and numbering the random access channels with different frequency-domain positions in an ascending order of frequency so as to obtain indexes 0~K−1;

if selecting the random access channel is the first time of selecting the random access channel, selecting an index by rule of $n_{RA}^{k}=g(K)$ so as to select the random access channel corresponding to the index, otherwise selecting an index by rule of $(n_{RA}^{k-1}+u)$ mod K so as to select the random access channel corresponding to the index; wherein, k is an integer no less than zero, k represents times for transmitting the preamble repeatedly, when k=0, $n_{RA}^{k}=n_{RA}^{0}$ represents the random access channel index used to transmit preamble at the first time, when k≠0, $n_{RA}^{k}$ represents the random access channel index used to transmit the preamble at the $k^{th}$ time, u represents a frequency-domain interval parameter, g( ) represents a pseudo-random generation function, and the function g( ) is used to generate pseudo-random numbers ranging from 0~K−1.

Preferably, wherein, $K=N_{UL}$, $N_{UL}$ represents number of Physical Resource Block (PRB) allocated for downlink system bandwidth.

Preferably, the u comprises any one of the following conditions:

u is an integer greater than zero, u is related to $n_{RA}^{0}$, that is, $u=u(n_{RA}^{0})$, $n_{RA}^{0}$ represents the random access index used to transmit the preamble at the first time;

u is related to k, that is u=u(k), k represents times for transmitting the preamble repeatedly;

u is related to both of $n_{RA}^{0}$ and k, that is, $u=u(n_{RA}^{0}, k)$;

$u=n_{RA}^{gap}(t_k-t_{k-1})$, $n_{RA}^{gap}$ is a constant configured by a base station, $n_{RA}^{gap}$ represents a variable value of index value of random access channel in the unit of time-slot, $t_k-t_{k-1}$ represents time-slot difference between the current time slot and the time slot of random access channel used to transmit the preamble at the previous time;

k is a pseudo-random number.

Preferably, wherein, when k is a pseudo-random access number, the conditions of u specifically comprises: u=g(K) or $u=g(K)(t_k-t_{k-1})$, wherein, g( ) represents a pseudo-random generation function, and the function g( ) is used to generate pseudo-random numbers ranging from 0~K−1.

Preferably, wherein, the g(K) comprises g(K, R), and the g(K, R) comprises any one of the following conditions:

$$g(K,R)=(\Sigma_{n=f_1}^{f_2}c(n)2^{n-f_1})\mod K;$$

$$g(K,R)=(\Sigma_{n=f_1}^{f_2}c(n)2^{n-f_1})\mod(K-1)+1;$$

$$g(K,R)=(\Sigma_{n=f_1}^{f_1}c(n)2^{n-f_1}+1)\mod K;$$

wherein, g(K, R) is a function which is related to bot of the K and R, the functions $f_1$ and the $f_2$ represent a starting point and an ending point of summation, respectively, c(n) represents a pseudo-random sequence, an initial state $c_{init}$ of c(n) is the parameter R, and $f_1$, $f_2$ and $c_{init}$ are related to one or more of following information, respectively: information on Cell ID $N_{ID}^{cell}$, information on time-slot ID $t_{id}$, information on ID of the optimal transmitting beam of a base station $B_{id}$ acquired in downlink synchronization, and information on the UE ID $U_{id}$.

Preferably, wherein, the g(K) comprises g(k, K, R), and wherein, g(k, K, R) is a function which is related to all of k, K and R, k is an integer no less than zero, k represents times for transmitting the preamble repeatedly; R relates to one or more of following information: information on Cell ID $N_{ID}^{cell}$, information on time-slot ID $t_{id}$, information on ID of the optimal transmitting beam of a base station $B_{id}$ acquired in downlink synchronization, and information on the UE ID $U_{id}$.

Preferably, wherein, the g(k, K, R) comprises any of the following conditions:

$$g(k,K,R)=(\Sigma_{n=f_1(k)}^{f_2(k)}c(n)2^{n-f_1(k)})\mod K;$$

$$g(k,K,R)=(\Sigma_{n=f_1(k)}^{f_2(k)}c(n)2^{n-f_1(k)})\mod(K-1)+1;$$

$$g(k,K,R)=(\Sigma_{n=f_1(k)}^{f_2(k)}c(n)2^{n-f_1(k)}+1)\mod K;$$

wherein, g(k, K, R) is a function which is related to all of k, K and R, functions $f_1(k)$ and $f_2(k)$ represent a starting point and an ending point of the summation, respectively, c(n) represents a pseudo-random sequence, and an initial state $c_{init}$ of c(n) is the parameter R.

Preferably, wherein, the $c_{init}$ satisfies: $c_{init}=N_{ID}^{cell}$, $c_{init}=t_{id}$, $c_{init}=B_{id}$ or $c_{init}=U_{id}$.

Preferably, wherein, the c(n) is an M sequence or a Gold sequence, a generating polynomial of the c(n) is configured by the base station via system information, downlink control channel or downlink shared channel.

Preferably, wherein, the $U_{id}$ is represented by all or part of bits of the UE unique identifier.

Preferably, wherein, the UE unique identifier is S-Temporary Mobile Subscriber Identity (S-TMSI) or Cell-Radio Network Temporary Identifier (C-RNTI).

Preferably, after the step of transmitting a preamble on the selected random access channel so as to initiate a random access attempt, further comprising: if the random access attempt fails, determining random access channel to be selected at this time according to the random access channel resource set acquired at the previous time and the random access channel selected at the previous time; or returning to perform the step of selecting a random access channel from the random access channel resource set; or, returning to perform the step of acquiring information of random access channel resource set.

Preferably, wherein, the step of acquiring information of random access channel resource set, comprises: acquiring the random access channel resource set from the received random access channel configuration information.

Preferably, wherein, the random access channel configuration information comprises master information block in broadcast channel or system information block indicated by the master information block.

In another embodiment, a user equipment for selecting random access channel in wireless communication system provided.

The method includes a channel acquiring module, configured to acquire information of random access channel resource set, the random access channel resource set comprising a multiple of random access channels;

a channel selecting module, configured to select a random access channel from the random access channel resource set;

a preamble transmitting module, configured to transmit the selected random access channel so as to initiate a random access attempt.

In yet another embodiment, a method for operating a terminal in a wireless communication system is provided. The terminal includes acquiring information regarding resource set comprising a plurality of random access channels, selecting a random access channel among the plurality of the random access channels, and transmitting, to a base station, a preamble on the random access channel.

In yet another embodiment, a terminal in a wireless communication system is provided. The terminal includes at least one processor configured to acquire information regarding resource set comprising a plurality of random access channels, select a random access channel among the plurality of the random access channels, and a transceiver configured to transmit, to a base station, a preamble on the random access channel.

Compared with the prior art, the technical effect of the present invention includes: by selecting a random access channel according to the information acquired from the base station for transmitting the preamble, the frequency selection range of the random access channel is greatly extended, the hopping range of random access is expanded to whole system bandwidth, and thus higher frequency diversity gain is acquired, the integral performance of random access is significantly improved, in particular the random access performance in the channel environment in which frequency selectivity is relatively high.

The technical effect of the present invention further includes: by selecting the random access channel using random or pseudo-random manner, the frequency-domain selection range of the random access channel can be controlled and adjusted according to the pseudo-random function, which provides the system with higher flexibility and extendibility.

BRIEF DESCRIPTION OF THE DRAWINGS

For a more complete understanding of this disclosure and its advantages, reference is now made to the following description, taken in conjunction with the accompanying drawings, in which:

FIG. 1 illustrates a wireless communication system according to various embodiments of the present disclosure;

FIG. 2 illustrates the BS in the wireless communication system according to various embodiments of the present disclosure;

FIG. 3 illustrates the terminal in the wireless communication system according to various embodiments of the present disclosure;

FIG. 4 illustrates the communication interface in the wireless communication system according to various embodiments of the present disclosure;

FIG. 5 illustrates a flowchart of a method for random access channel selection according to various embodiments of the present disclosure;

FIG. 6 illustrates a flowchart of a contention-based random access at the UE side according to various embodiments of the present disclosure;

FIG. 7 illustrates a schematic diagram in which the random access channels are distributed continuously and discretely according to various embodiments of the present disclosure;

FIG. 8 illustrates a schematic diagram of a correspondence between the synchronization signal block and the random access channel according to various embodiments of the present disclosure;

FIG. 9 illustrates a schematic diagram of a random access channel selection mode of Embodiment 1 according to various embodiments of the present disclosure;

FIG. 10 illustrates a schematic diagram of a mapping relation of random access channel frequency-domain positions of Embodiment 3 according to various embodiments of the present disclosure;

FIG. 11 illustrates a schematic diagram of another mapping relation of random access channel frequency-domain positions of Embodiment 3 according to various embodiments of the present disclosure;

FIG. 12 illustrates a module diagram of the user equipment for random access channel selection according to various embodiments of the present disclosure.

DETAILED DESCRIPTION

To make the objectives, technical scheme and advantages of the present application clearer for those skilled in the art, the present application will be further described below completely and in details with reference to the accompanying drawings.

The flow described in the specification, claims and the above accompanying drawing of the present invention contains a multiple of operations presented in a specific order. However, it shall clearly understand that, these operations can be executed or executed in parallel in a different order compared with the order presented in the present invention. The operation numbers such as 101, 102 or others are merely used for distinguishing each different operation. The operation numbers themselves does not represent any execution order. In addition, these flows can include more or less operations, which can be executed or executed in parallel in an order. It is to be noted that, the descriptions "the first", "the second" and or others descriptions in the present invention are used for distinguishing the different information, equipments, modules or others, which do not represent any sequential order, and do not limit "the first" and "the second" are different types.

The technical solution in the embodiments of the present invention will be further described clearly and completely in combination with the accompanying drawings in the embodiments of the present invention below. Apparently, the described embodiments are merely parts of the embodiments of the present invention, not the all embodiments. Based on the embodiments of the present invention, all the other embodiments acquired by those skilled in the art without any creative effort belong to the protection scope of the present invention.

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for selecting random access channel in a wireless communication system.

The terms referring to information, the terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3$^{rd}$ Generation Partnership Project (3GPP)), they are only examples for the description. Various embodiments of the present disclosure may be easily modified and applied to other communication systems.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (Enb)," "5$^{th}$ generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor. According to various embodiments, the controller 240 may includes. Here, may be a command/code temporarily resided in the controller 240, a storage space that stores the command/code, or a part of circuitry of the controller 240.

According to exemplary embodiments of the present disclosure, the controller 240 may control to receive, from a terminal, a preamble on the random access channel.

For example, the controller 240 may control the base station to perform operations according to the exemplary embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP). According to various embodiments, the controller 330 may includes. Here, may be a command/code temporarily resided in the controller 330, a storage space that stores the command/code, or a part of circuitry of the controller 330.

According to exemplary embodiments of the present disclosure, the controller 330 may acquire information regarding resource set comprising a plurality of random access channels. Further, the controller 240 may select a random access channel among the plurality of the random access channels. Then the controller 240 may control to transmit, to a base station, a preamble on the random access channel. For example, the controller 330 may control the terminal to perform operations according to the exemplary embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

Random Access (RA) process is a key step for establishing communication link between the user side and the network side in the radio communication system, which is used for establishing uplink synchronization between a user equipment (UE) and a base station, and used for the base station to allocate the UE the ID which is used for identifying the UE.

In LTE-TDD mode, the system has a multiple of random access channels, the frequency-domain position of the random access channel is determined by parameters $n_{PRBoffset}^{RA}$ and $f_{RA}$. For preamble format 1-3, these parameters are determined by:

$$n_{PRB}^{RA} = \begin{cases} n_{PRBoffset}^{RA} + 6\left\lfloor \dfrac{f_{RA}}{2} \right\rfloor, & \text{if } f_{RA} \bmod 2 = 0 \\ N_{RB}^{UL} - 6 - n_{PRBoffset}^{RA} - 6\left\lfloor \dfrac{f_{RA}}{2} \right\rfloor, & \text{otherwise} \end{cases}$$

For preamble 4, these parameters are determined by:

$$n_{PRB}^{RA} = \begin{cases} 6 f_{RA}, & \text{if } ((n_f \bmod 2) \times (2 - N_{SP}) + t_{RA}^{(1)}) \bmod 2 = 0 \\ N_{RB}^{UL} - 6(f_{RA} + 1), & \text{otherwise} \end{cases}$$

wherein, $N_{RB}^{UL}$ is number of Physical Resource Block (PRB) of uplink system. As can be seen from the above resource mapping mode, in LTE-TDD mode, while attempting a multiple of random accesses, the UE is possible to perform frequency hopping on frequency domain, and is also possible to use the same frequency resource as a random access channel. Furthermore, the mode of the frequency hopping is very simple, that is, performing mapping of the frequency domain in an upper position and a lower position symmetry to the carrier frequency using the carrier frequency as a center.

Compared with the LTE, the working frequency band of the 5th Generation mobile communication technology (5G) has more diversification. The working frequency bands of the 5G may comprise low frequency band below 6 GHz and high frequency band above 6 GHz, even up to around 30 GHz. For enhanced mobile broadband service of high frequency band and large broadband in 5G, if a mapping mode in which the allocation of random access channel resources in LTE is relatively fixed is used, since the frequency diversity gain is unable to be provided, the performance of random access in the channel with high frequency selectivity (fading channel) will decrease. Besides, the resource allocation way of random access channel in LTE is relatively simple, lacks of flexibility and has a low adaptability for some scenes.

Given that, it is necessary to provide a method and a user equipment for selecting random access channel to solve the above technical problems.

The method for selecting random access channel and the UE according to this embodiment can be applied into the random access process of FDD mode of a radio communication system or of TDD mode of a radio communication system which including the contention-free random access process and the contention-based random access process. At the same time, the method for selecting random access channel and the UE according to this embodiment apply to a multiple of scenarios such as a scenario of high/low frequency band and a scenario of single/multi beam operation in 5G.

Referring to FIG. 5, the method for selecting random access channel according to this embodiment comprises the following steps:

Step 501, acquiring information of random access channel resource set, the random access channel resource set comprises a number of random access channels;

Step 502, selecting a random access channel from the random access channel resource set;

Step 503, transmitting a preamble on the selected random access channel so as to initiate a random access attempt.

Referring to FIG. 6, a flow of general contention-based random access at the UE side is introduced first in the following.

(1) After completing downlink synchronization, the UE reads a master information block in broadcast channel or system information block indicated by the master information block, to acquire the random access configuration information. The random access configuration information comprises random access preamble resource pool information, random access channel configuration information and random access channel selection mode information;

(2) The UE selects the preamble in an equal probability from the preamble resource pool, selects a random access channel from the random access channel resource set configured by the base station in accordance with the random access channel selection mode, so as to perform the random access attempt.

(3) If random access attempt fails, the UE selects a random access channel from the random access channel resource set configured by the bass station according to the random access channel selection mode by using the random access channel information selected when attempting the random access at the previous time, or transmits the preamble on the random access channel by using a random access channel specified by the base station so as to perform a new random access attempt.

(4) The above process is repeated until times of the random access attempt exceed the maximum transmitting time of the preamble configured by higher layer signaling.

The situation where above random access attempt fails comprises:

(1) The UE does not detect the Random Access Response (RAR) fed back by the base station within the RAR window;

(2) The UE detects the RAR fed back by the base station, however, the preamble contained in the RAR is inconsistent with the preamble transmitted by the UE;

(3) The Message (Msg3) of the UE is transmitted overtime, or the time of retransmission exceeds the maximum transmitting time configured by the high layer signaling;

(4) The UE unique identifier contained in the conflict-resolution message fed back by the base station received by the UE is inconsistent with the owned UE unique identifier.

The contention-free random access process is different from the contention-based random access in that: the preamble transmitted by the UE is directly specified by the base station instead of being selected directly from the preamble resource pool. The other condition of the contention-free random access at the UE side in this embodiment is the same as that of the contention-based random access.

Supposing the system bandwidth is BW, the bandwidth of the random access channel is $BW_{PRACH}$, wherein $BW > BW_{PRACH}$. The base station simultaneously allocates a multiple of available random access channels (i.e. the random access channel resource set) on the time slot where the random access may occur, and informs time-frequency positions of these available random access channels in the master information block of the broadcast channel or in the system-information indicated by the master information block. For the same time slot, the available random access channels can be distributed discretely on frequency domain, or can be distributed continuously, as shown in FIG. 7.

In the condition that the random access channels are distributed continuously on frequency domain, the base station can inform time-frequency position of each random access channel, also can inform time-frequency position of the first random access channel (for example, uses the random access channel with the minimum frequency-domain index as the first, or uses the random access channel with the maximum frequency-domain index as the first) or number of the random access channels within this time slot (or the time-frequency position of the last random access channel) in the master information block or in the system information indicated by the master information block in the broadcast channel. According to the above information, the UE can deduce the time-frequency positions of all random access channels allocated by the base station in the random access channel configuration information.

In the condition that the random access channels are distributed discretely on frequency domain, the intervals among each random access channels of the same time slot are equal, for example, the Physical Resource Block (PRB) with same interval. At this time, the base station can inform time-frequency position of each random access channel, also can inform time-frequency position of the first random access channel (for example, uses the random access channel with minimum frequency-domain index as the first, or uses the random access channel with the maximum frequency-domain index as the first), the frequency-domain interval of two random access channels (in unit of the subcarrier or PRB), and number of the random access channels within this time slot (or the time-frequency position of the last random access channel) in the master information block or in the system information indicated by the master information block in the broadcast channel. According to the above information, the UE can deduce the time-frequency positions of all random access channels allocated by the base station in the random access channel configuration information.

The base station can also inform the random access channel resource set in other modes, for example, the determination mode of defined frequency position to be informed in a parameter mode. The UE acquires the position of the random access channel allocated by the base station according to the determination mode of the defined frequency position and the parameter configured in the master information block of the broadcast channel or in the system information indicated by the master information block. For example, for the $k^{th}$ random access channel, using the first PRB index $n_{PRB}^{k\_RA}$ as an indication, the calculation mode of $n_{PRB}^{k\_RA}$ is:

$$n_{PRB}^{k\_RA} = f(n_{PRBoffset}^{RA}, k), 1 \text{offs}$$

Wherein, $n_{PRBoffset}^{RA}$ is informed by higher layer signaling, which represents index of the first PRB of the first random access channel, K is number of the random access channels allocated on one time slot which is configured by the higher layer signaling. The function f represents the parameter $n_{PRB}^{k\_RA}$ calculated by the parameters $n_{PRBoffset}^{RA}$ and k. One possible calculation way is:

$$n_{PRB}^{k\_RA} = \mod(n_{PRBoffset}^{RA} + k, N_{PRB}), 1 \text{ffs}$$

Wherein, parameter $N_{PRB}$ is number of PRB contained in the allocated uplink band.

The above formula is the determination mode of the defined frequency position. According to the above formula and the parameters allocated by the broadcast channel including the parameter $n_{PRBoffset}^{RA}$, $N_{PRB}$ and K, the UE can acquire the time-frequency positions of all K random access channels.

In a multi-beam operation scene, since the base station needs to decide the owned optimal transmitting beam direction according to the random access channel resource used by the UE or the preamble, the random access channel resources indicated by the broadcast channel in the synchronization signal block (SS Block) contained in the different transmitting beam of the base station are different. However, the broadcast channel in the SS block contained in one transmitting beam of the base station may indicate a multiple of available random access channels, and the indication relation is shown in FIG. 8. In FIG. 8, a multiple of SS Blocks are contained in a SS Block group, and each SS Block corresponds to different transmitting beam direction of the base station side. Each SS Block indicates a multiple of random access channels, a multiple of random access channels belongs to different random access channel groups. A multiple of random access channels indicated by different SS Blocks are not mutually overlapped.

Therefore, the selection for the random access channel in the method for random access channel selection of this embodiment can also apply to the selection for the random access channel group as required. In FIG. 8, a multiple of random access channels form a random access channel group, each random access channel in the random access channel group is configured in a frequency-division mode. The random access channel group corresponds to the above-mentioned random access channel, the first random access channel index in the random access channel group corresponds to the first PRB index $n_{PRB}^{k\_RA}$ of the above-mentioned random access channel. Meanwhile, each random access channel in the random access channel group can be configured in a time-division mode, or a mode of frequency division combined with time division.

Embodiment 1

Referring to FIG. 9, three selection modes of random access channel are provided in this embodiment.

Mode 1, the UE selects a random access channel specified by the base station for transmitting the preamble.

Mode 2, the UE selects a random access channel in an equal probability randomly or pseudo-randomly from all available random access channels for transmitting the preamble.

Mode 3, the UE ranks and numbers the all available random access channels (the frequency-domain positions of at least two random access channels are different) in an ascending order of frequency so as to obtain indexes 0~K−1, selects an index in accordance with the following rule, so as to select the random access channel corresponding to this index for transmitting the preamble.

$$n_{RA} = g(K)$$

Wherein, $n_{RA}$ represents random access channel index used for transmitting preamble for this time, g( ) represents a pseudo-random generation function, the function g( ) is used for generating a pseudo-random number ranging from 0~K−1, the maximum value of K can reach to the number of PRB allocated by the uplink system bandwidth (bandwidth for transmitting the system information), that is, K=$N_{UL}$, at this time, the range for the UE to select the random access channel may extend into the whole band, the range of the frequency hopping is greatly extended, and the system acquires a huge frequency diversity gain.

A possible g(K) is g(K, R), and R is the parameter related to variable, for example:

$$g(K, R) = \left(\sum_{n=f_1}^{f_2} c(n) 2^{n-f_1}\right) \mod K$$

or $$g(K, R) = \left(\sum_{n=f_1}^{f_2} c(n) 2^{n-f_1}\right) \mod(K-1) + 1$$

or $$g(K, R) = \left(\sum_{n=f_1}^{f_2} c(n) 2^{n-f_1} + 1\right) \mod K$$

Wherein, the functions $f_1$ and $f_2$ represent a starting point and an ending point of summation, respectively, and the functions $f_1$ and $f_2$ respectively relate to one or more following information: times K for retransmitting the preamble, information on Cell ID $N_{ID}^{cell}$, information on time-slot ID $t_{id}$, information on ID of the optimal transmitting beam of a base station $B_{id}$ acquired in downlink synchronization, and information on the UE ID $U_{id}$. When the functions $f_1$ and $f_2$ relate to k, g(K, R) becomes g(k, K, R), and several possible g(k, K, R) are:

$$n_{RA}^k = g(k, K, R) = \left(\sum_{n=f_1(k)}^{f_2(k)} c(n)2^{n-f_1(k)}\right) \bmod K$$

or $$n_{RA}^k = g(k, K, R) = \left(\sum_{n=f_1(k)}^{f_2(k)} c(n)2^{n-f_1(k)}\right) \bmod(K-1) + 1$$

or $$n_{RA}^k = g(k, K, R) = \left(\sum_{n=f_1(k)}^{f_2(k)} c(n)2^{n-f_1(k)} + 1\right) \bmod K$$

Wherein, k is an integer no less than zero, when k=0, $n_{RA}^k = n_{RA}^0$ represents the random access channel index used for transmitting preamble at the first time, and when kre, $n_{RA}^k$ represents the random access channel index used for retransmitting the preamble at the $k^{th}$ time. A simple expression showing that the functions $f_1$ and $f_2$ relate to k is $f_1(k)=10k+1$, $f_2(k)=10k+9$. When the functions $f_1$ and $f_2$ do not relate to any variables, a simple expression is $f_1=1$, $f_2=9$.

c(n) represents a pseudo-random sequence, an initial state $c_{init}$ of c(n) is the parameter R, $c_{init}$ may relate to one or more of the following information: information on Cell ID $N_{ID}^{cell}$, information on time-slot ID $t_{id}$, information on ID of the optimal transmitting beam of a base station $B_{id}$ acquired in downlink synchronization and information on the UE ID $U_{id}$.

For example, $c_{init}$ may be: $c_{init}=N_{ID}^{cell}$ or $c_{init}=t_{id}$ or $c_{init}=B_{id}$ or $c_{init}=U_{id}$ The information of the UE ID $U_{id}$ can be represented by all or part of bits of the UE unique identifier. The UE unique identifier comprises S-Temporary Mobile Subscriber Identity (S-TMSI) of the UE itself or Cell-Radio Network Temporary Identifier (C-RNTI) allocated by the base station in an RRC connection state. Furthermore, it is to be noted that the factors for determining the initial state of the pseudo-random sequence provided above can be used in combination, for example, determining the initial state by simultaneously using the combination of the information on the Cell ID and information on time-slot ID, then the initial state is expressed as the form of $c_{init}=N_{ID}^{cell}+t_{id}$. The same form can also be applied to other combinations so as to determine the initial state, for example, determining the initial state by simultaneously using the information on UE ID and the information on the Cell ID: $c_{init}=U_{id}+N_{ID}^{cell}$.

The pseudo-random sequence c(n) can be fixed, or can be dynamically informed to the UE by the base station via the master information block in the physical broadcast channel or the system information block indicated by the master information block where appropriate, or can be informed to the UE by the base station in the system information, downlink control channel or downlink shared channel. The pseudo-random sequence c(n) can also be an M sequence or a Gold sequence.

If the pseudo-random sequence c(n) uses an M sequence, the generating polynomial can be directly specified by the base station since the M sequence only needs one generating polynomial. For example, a look-up table is preset in the UE, which is the same as that in the base station. The base station informs the UE of the index of the look-up table via the system information, downlink control channel or downlink shared channel so as to specify the generating polynomial used by the UE. A simple example of the look-up table is shown in table 1.

TABLE 1

Look-up table of generating polynomial

| Index | Generating polynomial |
|---|---|
| 0 | Polynomial 1 |
| 1 | Polynomial 2 |
| 2 | Polynomial 3 |
| ... | ... |

Furthermore, the generating polynomial required by the M sequence can also be selected by the UE by itself in a range preconfigured by the base station, for example, a look-up table is preset in the UE which is the same as that in the base station, as shown in table 1. The base station provides indexes of a multiple of look-up tables so as to inform the base station of the range of the optional generating polynomials. The base station selects generating polynomial of an M sequence in an equal probability randomly or pseudo-randomly within the range by itself.

If the pseudo-random sequence c(n) uses a Gold sequence, considering the fact that the Gold sequence is obtained by Modulo-2 summation of two M sequences, the UE can preconfigure so that one of generating polynomials is fixed and the other generating polynomial is specified by the base station, or that the generating polynomials of the two M sequences are both specified by the base station via the broadcast channel. If one generating polynomial is fixed and the other generating polynomial is specified by the base station, the generating polynomial specified by the UE can be informed by the base station in the mode of the look-up table shown in table 1; if the generating polynomials of the two M sequences are both specified by the base station, the generating polynomials can also be informed in a mode of look-up table, the difference lies in that: each index in the look-up table corresponds to a group of generating polynomials (i.e. the two generating polynomials of the Gold sequence).

The determination of the initial state of the M sequence and the two initial states of the Gold sequence both apply to the above condition of $c_{init}$, in particular to the condition that the two initial states of the Gold sequence can be determined respectively and independently in accordance with the mode of determining $c_{init}$ as above-described without mutual influence.

Embodiment 2

In this embodiment, the UE selects the random access channel by the following procedure:

If it is the first time for the UE to initiate the random access process (i.e. times of transmitting repeatedly the preamble is 0, k=0), the UE selects the random access channel in accordance with the mode provided in Embodiment 1.

If it is not the first time for the UE to initiate the random access process (i.e. times of retransmitting the preamble is greater than or equal to 1, k), the UE selects the random access channel on the basis of the random access channel information used at the first time and random access channel selection mode information in the random access configuration information by the following rule.

The UE ranks and numbers all available random access channels (frequency-domain positions of at least two random access channels are different) in an ascending order of frequency so as to obtain indexes 0~K−1, wherein a rule for selecting random access channel index is:

$$n_{RA}^k = (n_{RA}^{k-1} + u) \bmod K$$

Wherein, k is an integer greater than zero, k represents times for retransmitting the preamble, $n_{RA}^k$ represents the random access channel index used when retransmitting the preamble at the $k^{th}$ time. The above formula shows that, equal number of the frequency-domain units is spaced between the random access channel position used for preamble attempt in each random access process and the random access channel position used for preamble attempt in the previous random access process, and the value of the interval is the parameter u.

The u in the above formula can be configured as an integer greater than zero which is specified by the base station via higher layer signaling, or can be preconfigured in the UE.

The frequency-domain interval parameter u can also relate to the random access channel index $n_{RA}^0$ selected by the UE when initiating the random access at the first time (i.e. k=0), that is, $u=u(n_{RA}^0)$. Different initial random access channel indexes correspond to different u, and the correspondence can be informed by the base station to the UE via the random access configuration information. For example, a look-up table is preset in the UE, which is the same as that in the base station. The base station indicates the value of the parameter u by informing the index of the look-up table to the UE, and a simple example of a look-up table is shown in table 2. When transmitting the preamble at the first time, the UE looks up the table according to the selected random access channel index and determines the frequency-domain interval parameter u. While performing the preamble attempt subsequently, the UE determines the random access channel used at the current attempt according to the frequency-domain interval parameter u and the random access channel index selected at the previous time.

TABLE 2

Look-up table for frequency-domain interval parameter u

| Random access channel index $n_{RA}^0$ | Frequency-domain interval parameter u |
|---|---|
| 0 | $u_0$ |
| 1 | $u_1$ |
| 2 | $u_2$ |
| ... | ... |

The frequency-domain interval parameter u can also relate to times k for transmitting the preamble repeatedly, that is, u=u(k). A simple example is:

$$u(k) = \begin{cases} u_1 & \text{if condition 1 is satisfied} \\ u_2 & \text{if condition 2 is satisfied} \\ \phantom{u_L} \cdots \\ u_L & \text{if condition L is satisfied} \end{cases}$$

Wherein, condition 1, condition 2 . . . condition L is mutually disjointed and can cover all condition sets of possibility. A simple condition set is: condition 1 is k mod L=l−1.

Besides, the frequency-domain interval parameter u can not only relate to $n_{RA}^0$ but also relate to k, that is, $u=u(n_{RA}^0, k)$. Different initial random access channel indexes $n_{RA}^0$ correspond to different frequency-domain interval parameters u related to times k for transmitting the preamble repeatedly.

The frequency-domain interval parameter can also have the following relation: $u=n_{RA}^{gap}(t_k-t_{k-1})$, wherein, $n_{RA}^{gap}$ is a constant configured by the base station, $n_{RA}^{gap}$ represents a variable value of index of random access channel in the unit of time-slot, $t_k-t_{k-1}$ represents a time-slot difference between the current time slot and the time slot of random access channel used to transmit the preamble at the previous time. The relation of the above formula u shows that, there is a linear relation between the random access channels of different time slots and the time slot on frequency domain. The time-slot difference can be represented in a form of absolute time-slot difference, that is, numbers of time slot between the time slots where the random access channels selected for two times are located; also can be represented in a relative time-slot difference form, that is, the time-slot index can be obtained by ranking and numbering the time-slot available to random access in accordance with an ascending order of time, the difference of the index of the time slot where the random access channels selected for two times are located is calculated. $n_{RA}^{gap}$ can be configured by the base station and can be informed to the UE via the system information. For example, a look-up table is preset in the UE which is the same as that in the base station. The base station indicates the value of the $n_{RA}^{gap}$ by informing to the UE of the index of the look-up table. A simple example of a look-up table is shown in table 3.

TABLE 3

Look-up table of parameter $n_{RA}^{gap}$

| Index | Value of $n_{RA}^{gap}$ |
|---|---|
| 0 | $n_1$ |
| 1 | $n_2$ |
| 2 | $n_3$ |
| ... | ... |

Preferably, the frequency-domain interval parameter u can also be a pseudo-random number, that is, the interval between the random access channel position used when attempting to transmit the preamble at each time of random access and the random access channel position used when attempting to transmit the preamble at the previous time of random access is a random number. The mode that u is a pseudo-random number can be: u=g(K) or $u=g(K)(t_k-t_{k-1})$, wherein, g( ) represents a pseudo-random generation function, the function g( ) is used for generating a pseudo-random number ranging from 0~K−1, the maximum value of K can reach to the number $N_{UL}$ of PRB allocated for the uplink system bandwidth (bandwidth for transmitting the system information), that is, $K=N_{UL}$, at this time, the range for the UE selecting the random access channel extends into the whole bandwidth, the range of the frequency hopping is greatly extended, and the system acquires great frequency diversity gain.

One possible g(K) is g(K, R), wherein R is a parameter relates to the variable, for example:

$$g(K, R) = \left( \sum_{n=f_1}^{f_2} c(n) 2^{n-f_1} \right) \bmod K$$

or $$g(K, R) = \left(\sum_{n=f_1}^{f_2} c(n)2^{n-f_1}\right) \bmod (K-1) + 1$$

or $$g(K, R) = \left(\sum_{n=f_1}^{f_2} c(n)2^{n-f_1} + 1\right) \bmod K$$

Wherein, the functions $f_1$ and $f_2$ represent a starting point and an ending point of summation, respectively, and the functions $f_1$ and $f_2$ can relate to one or more following information, respectively: numbers k for transmitting repeatedly the that of the base station, information on Cell ID $N_{ID}^{cell}$, information on time-slot ID $t_{id}$, information on ID of the optimal transmitting beam of a base station $B_{id}$ acquired in downlink synchronization, and information on the UE ID $U_{id}$. When the functions $f_1$ and $f_2$ relate to k, respectively, (K) becomes g(K, R), some possible forms of g(K, R) is:

$$g(k, K, R) = \left(\sum_{n=f_1(k)}^{f_2(k)} c(n)2^{n-f_1(k)}\right) \bmod K$$

or $$g(k, K, R) = \left(\sum_{n=f_1(k)}^{f_2(k)} c(n)2^{n-f_1(k)}\right) \bmod (K-1) + 1$$

or $$g(k, K, R) = \left(\sum_{n=f_1(k)}^{f_2(k)} c(n)2^{n-f_1(k)} + 1\right) \bmod K$$

Wherein, k is an integer greater than zero, k represents times for transmitting the preamble repeatedly. One simple expression that the functions $f_1$ and $f_2$ relate to k, respectively is: $f_1(k)=10k+1$, $f_2(k)=10k=9$. When the functions $f_1$ and $f_2$ do not relates to any variable, a possible expression is that: $f_1=1$, $f_2=9$.

c(n) represents a pseudo-random sequence, an initial state $c_{init}$ of c(n) is the parameter R, and $c_{init}$ relates to one or more following information, respectively: information on Cell ID $N_{ID}^{cell}$, information on time-slot ID $t_{id}$, information on ID of the optimal transmitting beam of a base station $B_{id}$ acquired in downlink synchronization, and information on the UE ID $U_{id}$. Accordingly, different transmitting beams of different UEs or base stations correspond to different frequency-domain intervals, which contributes to the expansion of the range of the frequency-hopping while decreasing contention conflict problem in the random access. For example, $c_{init}$ can be the form of:

$c_{init}=N_{ID}^{cell}$ or $c_{init}=t_{id}$ or $c_{init}=B_{id}$ or $c_{init}=U_{id}$ The information of the UE ID $U_{id}$ can be represented by all or part of bits of the UE unique identifier. The UE unique identifier comprises S-Temporary Mobile Subscriber Identity (S-TMSI) of the UE itself or Cell-Radio Network Temporary Identifier (C-RNTI) allocated by the base station in an RRC connection state. Furthermore, it is to be noted that the factors for determining the initial state of the pseudo-random sequence provided above can be used in combination, for example, determining the initial state using both of the information on the Cell ID and information on time-slot ID in combination, then the initial state is expressed as the form of $c_{init}=N_{ID}^{cell}+t_{id}$. The same form can also apply to other combinations so as to determine the initial state, for example, determining the initial state by using both of the information on UE ID and the information on the Cell ID in combination: $c_{init}=U_{id}+N_{ID}^{cell}$.

The pseudo-random sequence c(n) can be fixed, or can be dynamically informed to the UE by the base station via the master information block in the physical broadcast channel or the system information block indicated by the master information block where appropriate, or can be informed to the UE by the base station in the system information, downlink control channel or downlink shared channel. The pseudo-random sequence c(n) can also be an M sequence or a Gold sequence.

If the pseudo-random sequence c(n) uses an M sequence, the generating polynomial can be directly specified by the base station since the M sequence only needs one generating polynomial. For example, a look-up table is preset in the UE, which is the same as that in the base station. The base station informs the UE of the index of the look-up table via the system information, downlink control channel or downlink shared channel so as to specify the generating polynomial used by the UE. A simple example of the look-up table is shown in table 1.

Furthermore, the generating polynomial required by the M sequence can also be selected by the UE by itself in a range preconfigured by the base station, for example, a look-up table is preset in the UE which is the same as that in the base station, as shown in table 1. The base station provides indexes of a multiple of look-up tables so as to inform the base station of the range of the optional generating polynomials. The base station selects generating polynomial of an M sequence in an equal probability randomly or pseudo-randomly within the range by itself.

If the pseudo-random sequence c(n) uses a Gold sequence, considering the fact that the Gold sequence is obtained by Modulo-2 summation of two M sequences, the UE can preconfigure so that one of generating polynomials is fixed and the other generating polynomial is specified by the base station, or that the generating polynomials of the two M sequences are both specified by the base station via the broadcast channel. If one generating polynomial is fixed and the other generating polynomial is specified by the base station, the generating polynomial specified by the UE can be informed by the base station in the mode of the look-up table shown in table 1; if the generating polynomials of the two M sequences are both specified by the base station, the generating polynomials can also be informed in a mode of look-up table, the difference lies in that: each index in the look-up table corresponds to a group of generating polynomials (i.e. the two generating polynomials of the Gold sequence).

The determination of the initial state of the M sequence and the two initial states of the Gold sequence both apply to the above condition of $c_{init}$, in particular to the condition that the two initial states of the Gold sequence can be determined respectively and independently in accordance with the mode of determining $c_{init}$ as above-described without mutual influence.

Embodiment 3

Referring to FIG. 10, it is supposed in this embodiment that, available time slots of each random access only has a random access channel on frequency domain. The positions on the frequency domain of the random access channel in the time slot in which the transmission of the preamble is attempted at two successive times have a mapping relation, which relation can be informed to the UE via system information. The system information bearing the mapping relation can be transmitted via the master information block in the broadcast channel, or can be transmitted by the system information block indicated by the master information block. The signaling overhead can be decreased by presetting the mapping relation in the UE.

In this embodiment, the UE selects the random access channel by the following procedure:

If it is the first time for the UE to initiate the random access (i.e. times of transmitting the preamble repeatedly is 0, k=1), the UE reads the random access configuration information transmitted by the base station, and uses the random access channel index specified by the random access channel configuration information in the random access configuration information as the random access channel index $n_{RA}^0$ of transmitting the preamble for this time.

If it is not the first time for the UE to initiate the random access (i.e. times of transmitting the preamble repeatedly is greater than or equal to 1, k), the UE reads the random access configuration information transmitted by the base station, selects the random access channel for transmitting the preamble according to the random access channel selection mode information in the random access configuration information and the random access channel information selected at the previous time.

Specifically, the random access channel selection mode is the mode used when it is not the first time for the UE to initiate the random access in Embodiment 2, and the difference lies in that: the mode for selecting the random access channel in Embodiment 2 remains the same while the UE initiates attempt for transmitting the preamble each time, i.e. the same formulas are used, such as the formula $n_{RA}^k = (n_{RA}^{k-1} + (\Sigma_{n=f_1(k)}^{f_2(k)} c(n) 2^{n-f_1(k)}) \bmod K) \bmod K$ is used all the time. However, in this embodiment, each time the UE initiates attempt (besides the first time of transmitting) for transmitting the preamble, the UE reads the random access channel selection mode from the random access configuration information first, and then selects the random access channel according to the formula provided in the random access channel selection mode. Therefore, the mode for selecting the random access channel in this embodiment may change while each time the UE initiates attempt for transmitting the preamble. For example, it is possible that there is a condition that the formula $n_{RA}^k = (n_{RA}^{k-1} + (\Sigma_{n=f_1(k)}^{f_2(k)} c(n) 2^{n-f_1(k)}) \bmod K) \bmod K$ is used for selecting the random access channel when attempting transmission of the preamble at the second time and the formula $n_{RA}^k = (n_{RA}^{k-1} + (\Sigma_{n=f_1(k)}^{f_2(k)} c(n) 2^{n-f_1(k)}) \bmod (K-1)+1) \bmod K$ is used when attempting transmission of the preamble at the third time.

FIG. 10 provides the condition that the base station only configures a random access channel on each available time slot for each random access. In fact, the base station can also configure a multiple of random access channels on each available time slot for each random access, and define the frequency-domain mapping relation of each random access channel. The frequency-domain mapping relation of different random access channel on the same time slot may be the same, or may be different. FIG. 11 shows an example that different random access channels correspond to different frequency-domain mapping relations.

It is to be noted that, using the mode for selecting the random access channel according to Embodiment 2 and Embodiment 3, while determining the random access channel, the UE can only determine finally the random access channel of this time by confirming all the selected random access channel information from the first attempt for random access to this attempt for random access. However, this can provide a better randomness, so as to acquire a higher frequency diversity gain.

Referring to FIG. 12, a UE for selecting random access channel in this embodiment comprises:

a channel acquiring module, configured to acquire information of random access channel resource set, the random access channel resource set comprises a multiple of random access channels;

a channel selecting module, configured to select a random access channel from the random access channel resource set;

a preamble transmitting module, configured to transmit the selected random access channel so as to initiate a random access attempt.

The working flows of the channel acquiring module, channel selecting module and preamble transmitting module correspond to steps 101, 102 and 103 of the method for selecting random access channel in this embodiment, respectively, and will not be repeated here.

As can be seen in connection with the detailed description of the embodiment, compared with the prior art, the embodiment can obtain at least the following beneficial technical effects:

(1) a random access channel is selected according to the information acquired from the base station to transmit the preamble, which extends greatly the frequency selection range of the random access channel, in turn acquires a higher frequency diversity gain, and significantly improves the integral performance of random access, in particular of random access performance in the channel environment with high frequency selectivity.

(2) the random access channel is selected in form of random or pseudo-random, thus the frequency-domain selection range of the random access channel can be controlled and adjusted according to the pseudo-random function, which provides the system with a higher flexibility and extendibility.

(3) the random access frequency-hopping range is extended to the whole system bandwidth, which increases the reliability of the random access in the fading channel, and can accommodate the variable working frequency bandwidth of 5G communication system, in particular to the application scene of the enhanced mobile broadband service of high frequency band and wide broadband in 5G.

(4) a multiple of allocation modes (for example, the base station informs the UE of the random access configuration information by a multiple of modes) and selection modes (for example, two modes that the generated pseudo-random number relates to and does not relate to the selected random access channel at the first time) for random access resource is provided, which increases the flexibility of the random access, and have well adaptability for the requirements in different scenes.

(5) the generated pseudo-random number has better random distribution performance by introducing a multiple of related factors such as information on Cell ID, information on time-slot ID, information on the optimal transmitting beam of the base station and information on UE ID or the like, which contributes to extending the range of the frequency-hopping while decreasing problem of contention conflict in the random access.

In several examples provided by this embodiment, it should be understand that, the disclosed systems, devices and methods can be realized in other manners. For example, the device embodiment described above is merely schematic. For example, the classification of the unit is merely a logical function classification. Other classification modes can be provided while in the actual implementations. For example, a multiple of units or components can be combined or can be integrated to another system, or some features can be ignored, or cannot be executed. On the other point, the displayed or discussed coupling, directly coupling or communication connection between each other can be indirect coupling or communication connection of devices or units through some interfaces, which can be electrical, mechanical or other modes.

The unit as a separator for illustration can be separated physically or cannot be separated physically, the unit as a display component can be a physical unit or cannot be a physical unit, in other word, the display unit can located in one place, or the physical unit can be distributed to a multiple of network units. Part of units or all the units can be selected according to the actual requirement to realize the purpose of the embodiment.

Moreover, each of functional units in each embodiment of the present invention can be integrated into one process unit, or can exist in isolation as each unit physically, or can be integrated into one unit by at least two units. The above integrated unit can be realized using hardware, or can be realized using software functional unit.

Those skilled in the art can understand that part of the steps or the whole steps of the method of the embodiments can be completed by the indication of the related hardware according to the program. The program can be stored in a computer readable storage medium. The storage medium can comprises: Read Only Memory (ROM), Random Access Memory (RAM), Disc, CD or other storage mediums.

A mobile terminal provided in the present invention is described in detail. For those skilled in the art, according to the idea of embodiment of the present invention, there are changes on the specific implementations or application scopes. In conclusion, the content of the specification should not be understood as the limitation of the present invention.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A method performed by a terminal in a wireless communication system, the method comprising:
acquiring information of a resource set at least two random access channels with different frequency-domain positions;
numbering the at least two random access channels with different frequency-domain positions in an ascending order of frequency to obtain indexes 0~K-1;
when performing an initial random access attempt, selecting an index by rule of $n_{RA}^{k}=g(k)$ to select the random access channel corresponding to the index;
when performing a random access attempt different from the initial random access attempt, selecting an index by rule of $(n_{RA}^{k-1}+u)$ mod K to select the random access channel corresponding to the index; and
transmitting, to a base station, a preamble on the random access channel,
wherein, k is an integer no less than zero, k represents times for transmitting the preamble repeatedly, when k=0, $n_{ra}^{k}=n_{RA}^{0}$ represents a random access channel index used to transmit preamble at a first time, when k≥$n_{RA}^{k}$ represents the random access channel index used to transmit the preamble at a $k^{th}$ time, u represents a frequency-domain interval parameter, g( ) represents a pseudo-random generation function, and the function g( ) is used to generate pseudo-random numbers ranging from 0~K−1.

2. The method of claim 1, wherein the acquiring of the information of the resource set comprises acquiring the information of the resource set from received random access channel configuration information.

3. The method of claim 2, wherein, the random access channel configuration information comprises a master information block in broadcast channel or a system information block indicated by the master information block.

4. A terminal in a wireless communication system, the terminal comprising:
at least one processor configured to:
acquire information of a resource set including at least two random access channels with different frequency-domain positions,
number the at least two random access channels with different frequency-domain positions in an ascending order of frequency to obtain indexes 0~K−1;
when performing an initial random access attempt, selecting an index by rule of $n_{RA}^{k}=g(k)$ to select the random access channel corresponding to the index;
when performing a random access attempt different from the initial random access attempt, selecting an index by rule of $(n_{RA}^{k-1}+u) \mod K$ to select the random access channel corresponding to the index; and
a transceiver configured to transmit, to a base station, a preamble on the random access channel, wherein, k is an integer no less than zero, k represents times for transmitting the preamble repeatedly, when k=0, $n_{RA}^{k}=n_{RA}^{0}$ represents a random access channel index used to transmit preamble at a first time, when k≥$n_{RA}^{k}$ represents the random access channel index used to transmit the preamble at a $k^{th}$ time, u represents a frequency-domain interval parameter, g( ) represents a pseudo-random generation function, and the function g( ) is used to generate pseudo-random numbers ranging from 0~K−1.

5. The terminal of claim 4, wherein the at least one processor is further configured to acquire the information of the resource set from received random access channel configuration information.

6. The terminal of claim 5, wherein, the random access channel configuration information comprises a master information block in broadcast channel or a system information block indicated by the master information block.

* * * * *